US007734050B2

(12) United States Patent
Tengler et al.

(10) Patent No.: US 7,734,050 B2
(45) Date of Patent: Jun. 8, 2010

(54) DIGITAL CERTIFICATE POOL

(75) Inventors: Steve Tengler, Grosse Pointe Park, MI (US); Scott Andrews, Los Altos, CA (US); Ronald Heft, Farmington Hills, MI (US)

(73) Assignee: Nissan Technical Center North America, Inc., Farmington Hills, MI (US)

( * ) Notice: Subject to any disclaimer, the term of this patent is extended or adjusted under 35 U.S.C. 154(b) by 964 days.

(21) Appl. No.: 11/389,858

(22) Filed: Mar. 27, 2006

(65) Prior Publication Data

US 2007/0223702 A1 Sep. 27, 2007

(51) Int. Cl.
*H04K 1/00* (2006.01)
(52) U.S. Cl. .................. 380/270; 380/43; 380/45; 380/264; 380/277
(58) Field of Classification Search .......... 380/200, 380/30; 713/192, 168, 182; 726/4, 13, 30, 726/24; 709/12, 14
See application file for complete search history.

(56) References Cited

U.S. PATENT DOCUMENTS

| | | | |
|---|---|---|---|
| 6,819,245 B1 | 11/2004 | Dilling | |
| 7,486,795 B2 * | 2/2009 | Eschenauer et al. | 380/277 |
| 2003/0151507 A1 | 8/2003 | Andre et al. | |
| 2004/0003234 A1 * | 1/2004 | Reinold et al. | 713/155 |
| 2005/0147245 A1 * | 7/2005 | Hassan et al. | 380/44 |
| 2006/0039341 A1 | 2/2006 | Ptasinski et al. | |
| 2006/0173694 A1 * | 8/2006 | Itabashi | 705/1 |
| 2007/0094507 A1 * | 4/2007 | Rush | 713/176 |
| 2007/0200671 A1 * | 8/2007 | Kelley et al. | 340/5.72 |
| 2007/0206796 A1 | 9/2007 | Iino et al. | |
| 2007/0264973 A1 * | 11/2007 | Dowek et al. | 455/411 |
| 2008/0095374 A1 | 4/2008 | Schreyer | |
| 2008/0232382 A1 | 9/2008 | Iwama et al. | |

* cited by examiner

*Primary Examiner*—Kieu Oanh Bui
*Assistant Examiner*—Nega Woldemariam
(74) *Attorney, Agent, or Firm*—Global IP Counselors, LLP

(57) ABSTRACT

A wireless vehicle and infrastructure system is described that allows for utilization of a quasi-anonymous common private key/digital certificate pool, such that all vehicles are authenticated to the system, but no one vehicle/user can be readily identified during their use of the system because of their use of set of common private key/digital certificate pairs that are assigned to each vehicle from the pool and are common across multiple vehicles. Vehicle/user anonymity is only temporarily removed during vehicle/user re-authentication and re-issuance of new common private key/digital certificate pairs from the pool in the wireless vehicle and infrastructure system.

35 Claims, 6 Drawing Sheets

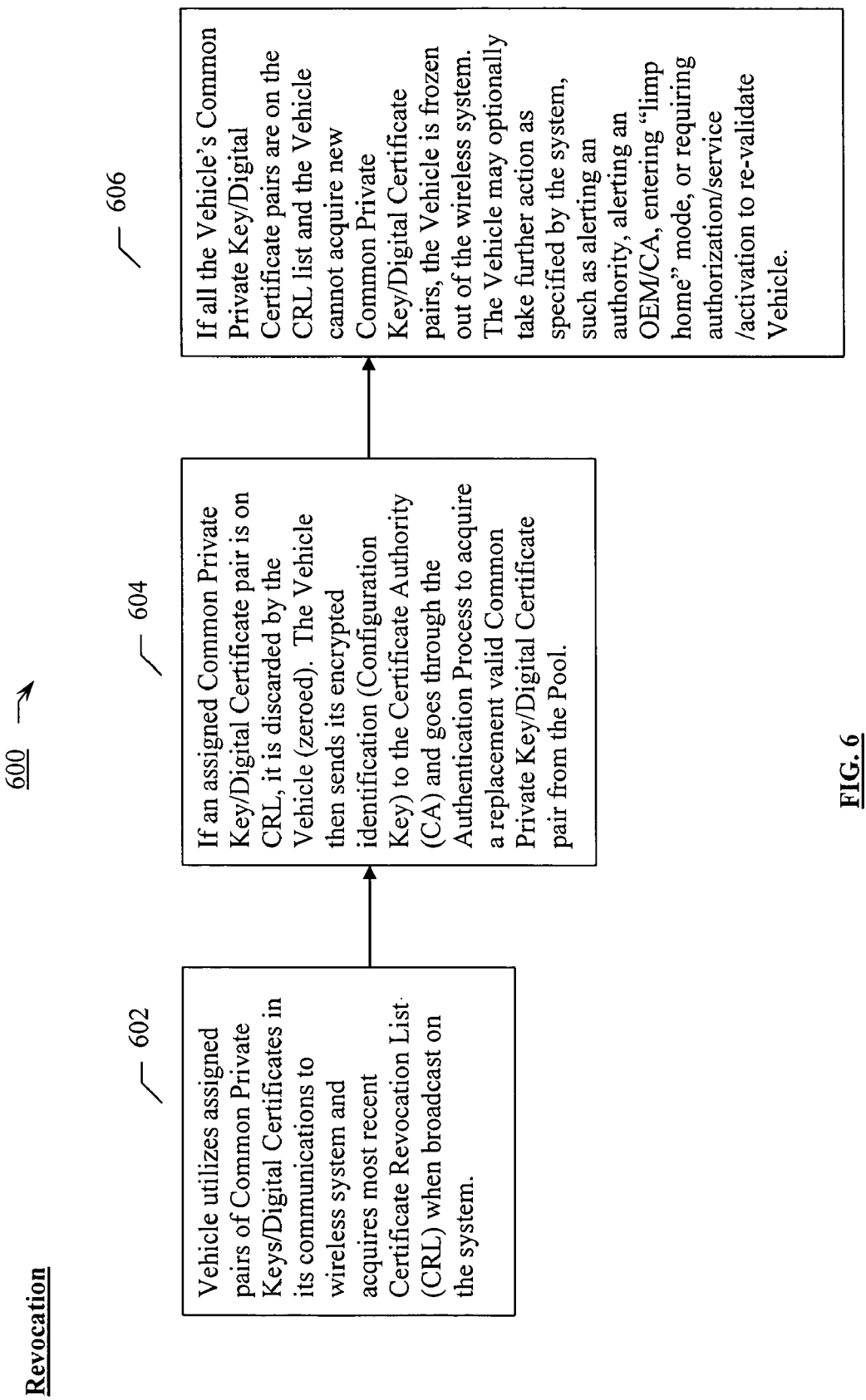

DIGITAL CERTIFICATE POOL

TECHNICAL FIELD

The present invention relates generally to authenticated quasi-anonymous digital certificates and in particular, the present invention relates to authenticated quasi-anonymous Dedicated Short Range Communications (DSRC) digital certificate pools in vehicles.

BACKGROUND

A vehicle-to-vehicle and vehicle-to-infrastructure wireless communication system creates a large number of potential uses that include crash avoidance, communications, law enforcement, and entertainment. One such system is the Dedicated Short Range Communications (DSRC) system. A vehicle-to-vehicle and vehicle-to-infrastructure wireless communication system would include a common message set (CMS), which is broadcast by each vehicle, that is comprised of relevant kinematical and location information including GPS/Vehicle position, velocity, vehicular dimensions, as well as other relevant vehicle information.

For example, in a crash avoidance system implementation utilizing the vehicle-to-vehicle and vehicle-to-infrastructure wireless communication system, a vehicle would utilize the CMS messages and analyze any received information to determine if a crash was imminent. If a crash with another vehicle was imminent, it would send a confirmation message to the other vehicle and then internally exchange information with vehicle sub-systems to mitigate vehicle/occupant damage/injury before crashing. For example, once the accident seems likely, the vehicle sub-systems such as airbags and seatbelts can be instructed to prepare for a crash.

Other high-end applications, including, but not limited to Internet access and telephony are also possible over such a vehicle-to-vehicle and vehicle-to-infrastructure wireless communication system.

Given this exchange of personal driver and vehicle information (e.g., over-speeding on the highway, passing another vehicle on the right) system users (such as drivers, vehicle owners, or other users) will desire privacy protection and will not wish to be specifically tracked electronically. Conversely, government agencies, law enforcement, infrastructure providers and original equipment manufacturers (OEMs) will desire ways to authenticate users/vehicles, protect the vehicle-to-vehicle and vehicle-to-infrastructure wireless communication system from hackers or attackers, and desire a way to track problem vehicles, problem users and/or malevolent actors and revoke their access to the system.

For the reasons stated above, and for other reasons stated below which will become apparent to those skilled in the art upon reading and understanding the present specification, there is a need in the art for authenticated quasi-anonymous certification of vehicle-to-vehicle and vehicle-to-infrastructure wireless communication systems for system users and motor vehicles.

SUMMARY

The above-mentioned problems of authenticated quasi-anonymous certification of vehicle-to-vehicle and vehicle-to-infrastructure wireless communication system enabled motor vehicles and other problems are addressed by the present invention and will be understood by reading and studying the following specification.

The various embodiments relate to a wireless vehicle and infrastructure system for utilizing a quasi-anonymous common private key/digital certificate pool and vehicle/user re-authentication and re-issuance of a new common private key/digital certificate pair from the pool in the wireless vehicle and infrastructure system. In one embodiment of the present invention, the vehicle-to-vehicle and vehicle-to-infrastructure wireless communication system utilizes a limited pool of common private key/digital certificate pairs to digitally sign or encrypt messages from each vehicle and authenticate it to the system as an authorized and valid user/vehicle. The pool of common private key/digital certificate pairs is randomly assigned and shared amongst the users/vehicles utilizing the wireless communication system. Each user/vehicle is assigned multiple valid common private key/digital certificate pairs from the pool and randomly selects a private key/digital certificate pair for use to sign or encrypt each message to the wireless communication network, such that any given common private key/digital certificate pair may be in use by multiple users/vehicles at a given moment, ensuring relative anonymity. A user or vehicle, however, must temporarily give up its anonymity to authenticate itself to the system in order for it to be assigned a new valid common private key/digital certificate pair from the currently active pool of common private keys/digital certificates. This is accomplished by sending a vehicle identifier, such as an ID, vehicle identification number (VIN) or a generated "configuration key", to a certificate authority (CA) and/or the original equipment manufacturer (OEM). The CA/OEM then authenticates the vehicle and/or onboard equipment as valid and assigns a new common private key/digital certificate pair from the currently valid pool.

Further embodiments of the invention include methods and apparatus of varying scope.

BRIEF DESCRIPTION OF THE DRAWINGS

FIG. 6 shows a flowchart of a method for revoking a common private key/digital certificate pair in the wireless system in accordance with an embodiment of the present invention.

DETAILED DESCRIPTION

Figure 1:
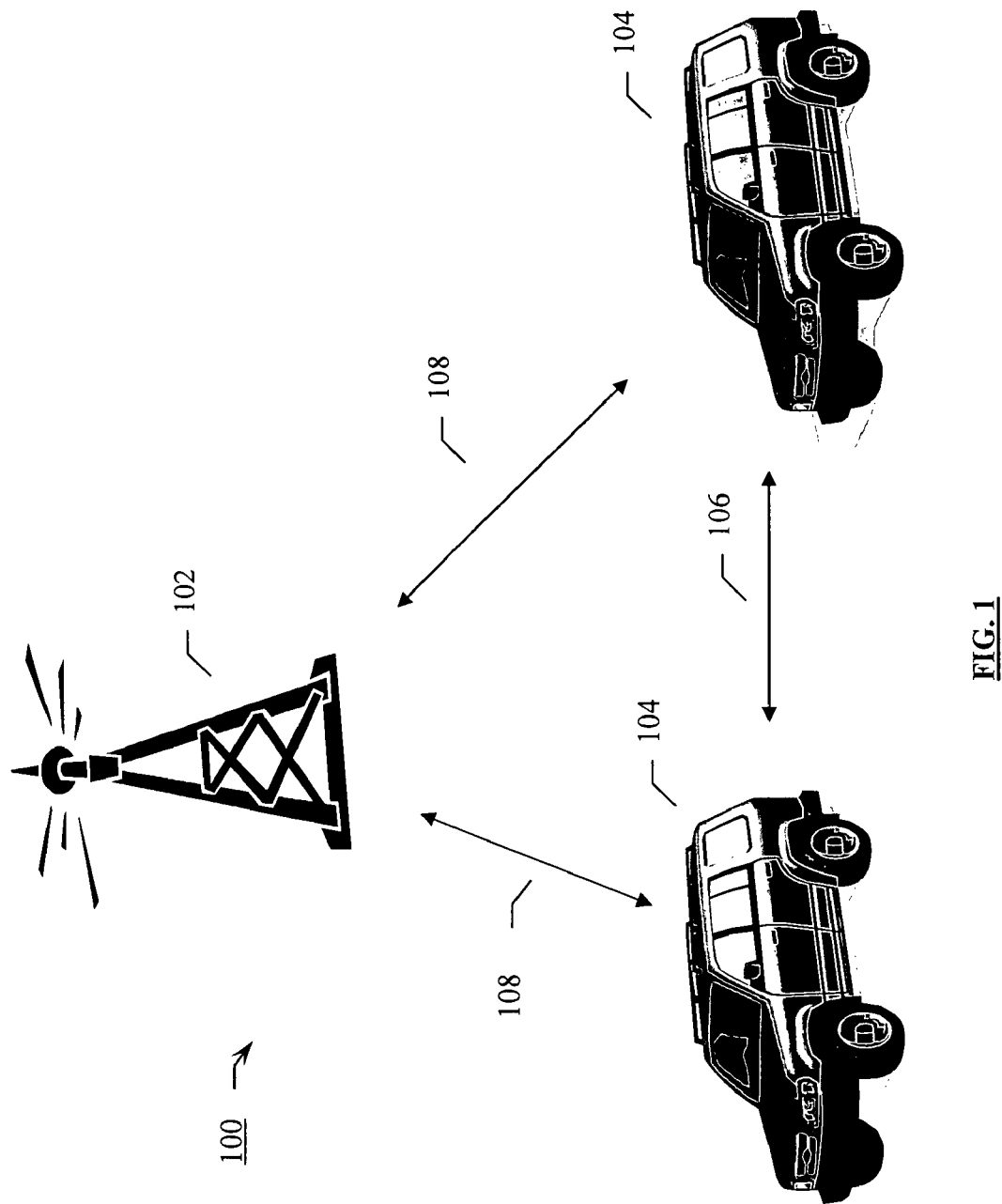
FIG. 1 shows a simplified diagram of a wireless, short range, vehicular communication system in accordance with an embodiment of the present invention.

In the following detailed description of the invention, reference is made to the accompanying drawings that form a part hereof, and in which is shown, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention. The following detailed description is, therefore, not to be taken in a limiting sense, and the scope of the present invention is defined only by the appended claims and equivalents thereof.

Embodiments of the present invention include a wireless vehicle and infrastructure system that allows for utilization of a quasi-anonymous common private key/digital certificate pool, such that all vehicles are authenticated to the system, but no one vehicle/user can be readily identified during their use of the system because of use of a set of common private key/digital certificate pairs that are assigned to each vehicle from the pool, where common private key/digital certificate pairs in each vehicle's assigned set are common across multiple vehicles. Vehicle/user anonymity is only temporarily removed during vehicle/user re-authentication and re-issuance of new common private key/digital certificate pairs to the user/vehicle from the pool in the wireless vehicle and infrastructure system. In one embodiment of the present invention, the vehicle-to-vehicle and vehicle-to-infrastructure wireless communication system utilizes a limited pool of common private key/digital certificate pairs to digitally sign or encrypt messages from each vehicle and authenticate it to the system as an authorized and valid user/vehicle. The pool of common private key/digital certificate pairs is randomly assigned and shared amongst the users/vehicles utilizing the wireless communication system. Each user/vehicle is assigned multiple valid common private key/digital certificate pairs from the pool and randomly selects a certificate for use to sign or encrypt each message to the wireless communication network, such that any given common private key/digital certificate pair may be in use by multiple users/vehicles at a given moment, ensuring relative anonymity. A user or vehicle, however, must temporarily give up its anonymity to authenticate itself to the system in order for it to be assigned a new valid common private key/digital certificate pair from the currently active pool of common private keys/digital certificates. This is accomplished by sending a vehicle identifier, such as an ID, vehicle identification number (VIN) or a generated "configuration key", to a certificate authority (CA) and/or the original equipment manufacturer (OEM). The CA/OEM then authenticates the vehicle and/or onboard equipment as valid and assigns a new common private key/digital certificate pair from the currently valid pool. The configuration key can include such information as the vehicle VIN and/or the electronic serial numbers (ESNs) of vehicle systems, the onboard equipment (OBE) or the wireless onboard unit (OBU). Pairs of common private keys/digital certificates from the valid pool can be revoked by the wireless communication system, which does this by periodically transmitting a certificate revocation list (CRL). Users/vehicles that have one or more revoked certificates assigned must re-authenticate with the CA/OEM to be assigned a new valid certificate. This allows the wireless system to identify, track and/or revoke access rights to bad actors by identifying users/vehicles that have had common private key/digital certificate pairs revoked and replaced more than a selected threshold.

Wireless communication between vehicles and to/from infrastructure will enable a vast number of potential systems ranging from crash avoidance to Internet entertainment systems. Enabling these systems might be possible with several technologies, including but not limited to wireless telephony, and Dedicated Short Range Communications (DSRC). In such systems, which are generally safety-related, a "Common Message Set" (CMS) will likely be broadcast by each vehicle giving a temporary ID (a "MAC address"), relevant kinematical and location information such as GPS/Vehicle Position, velocity, vehicular dimensions, etc. For example, a Crash Avoidance system, a vehicle would analyze the provided information, determine if a crash was imminent, send a confirmation note to the other vehicle, and quickly exchange all the information to confirm and mitigate the incident before crashing. Once the accident seems likely, the vehicle and systematic responses can be anywhere from invisible, elastic responses (e.g., pre-tension the seatbelt or pre-arm the airbag) to driver warnings (e.g., a seat vibration or a visual/auditory alert) to plastic, crash-mitigation responses (e.g., deploy an external airbag or align bumper heights). The advantages of such wireless communications over traditional systems, such as radar, are that it allows a two-way conversation, can be omni-directional beyond the juxtaposed vehicles, has a lower latency, and is much less expensive than traditional radar systems. For this reason, the FCC has allocated the 5.9 GHz band for such applications (with safety having the highest priority in any implemented systems, but other applications are also permitted therein as well).

As stated above, given this exchange of personal driver and vehicle information (e.g., over-speeding on the highway, passing another vehicle on the right) system users (such as drivers, vehicle owners, or other users) will desire privacy protection and will not wish to be specifically tracked electronically. Conversely, government agencies, law enforcement, infrastructure providers and original equipment manufacturers (OEMs) will desire ways to authenticate users/vehicles, protect the vehicle-to-vehicle and vehicle-to-infrastructure wireless communication system from hackers or attackers, and desire a way to track problem vehicles, problem users and/or malevolent actors and revoke their access to the system.

Wireless vehicle and infrastructure system embodiments of the present invention utilize a quasi-anonymous common private key/digital certificate pool, wherein all vehicles are authenticated to the system, but no one vehicle/user can be readily identified during their use of the system because their assigned common private key/digital certificate pairs are common across multiple vehicles in the system.

Imagine that every driver in the country had five or six generic (or photo-less) driver's licenses from a pool of 1000 or so possible licenses. The license could prove to a traffic cop that he/she was an authorized driver, but it wouldn't be a unique identifier. In addition, if he/she was driving reckless (i.e., breaking the rules) while using that license, it would be revoked from everyone and, in the short period that they had to request a new, generic license, they must provide a unique identifier. Therein, they could maintain privacy a vast majority of the time, but sacrifice anonymity during periods of revocation/replacement.

In embodiments of the present invention, each vehicle/user is randomly assigned a set of multiple valid common private key/digital certificate pairs from the pool and each vehicle is designed to randomly use a different common private key/digital certificate pair from their assigned set for each message to be sent, the message signed/encrypted by the common private key and vouched for by the certificate authority by the attached digital certificate in a public key infrastructure. Vehicle/user anonymity must only be temporarily revoked during vehicle/user authentication so that a new common private key/digital certificate pair can be issued to them from the pool of currently valid common private key/digital certificate pairs in the wireless vehicle and infrastructure system. Thus ensuring relative vehicle/user anonymity and yet allowing the system to authenticate who is a valid vehicle/user. The system can also revoke the common private key/digital certificates of a malicious or problem vehicle/user and thus ensure system integrity and identification of bad actors by tracking vehicles/users with large numbers of revocations/re-authorizations. It is noted that in other embodiments of the present invention, instead of a common private key/digital certificate pair being utilized, only a single common private key and/or other forms of asymmetric encryption or digital signatures may also be used. It is also noted that different common private key/digital certificate pairs may confer to the vehicle/user differing levels of access rights to the wireless vehicle and infrastructure system.

Authentication is accomplished by sending a vehicle identifier, such as an ID, vehicle identification number (VIN) or a generated "configuration key", to a certificate authority (CA) and/or the original equipment manufacturer (OEM). The CA/OEM then authenticates the vehicle and/or onboard equipment as valid and assigns a new common private key/digital certificate pair from the currently valid pool. The configuration key can include such information as the vehicle VIN and/or the electronic serial numbers (ESNs) of vehicle systems, the onboard equipment (OBE) or the wireless onboard unit (OBU). Pairs of common private keys/digital certificates from the valid pool can be revoked by the wireless communication system, which periodically transmits a certificate revocation list (CRL). Users/vehicles that have one or more revoked certificates assigned must re-authenticate with the CA/OEM to be assigned a new valid certificate. This allows the wireless system to identify, track and/or revoke access rights to bad actors.

In essence, the embodiments of the present invention provide a method of providing a security certificate or header on wireless messages (e.g., DSRC messages). Having an authorized certificate would permit the listener to know that the speaker is not an attacker, hacker or other malicious or problem user within the wireless network. Conversely, a malicious or problem user might be traced given either an egregious attack on the system (e.g. replacement/disruption of a critical component) or over several attacks on the system by having multiple certificates assigned to them revoked over a short time frame.

FIG. 1 illustrates a diagram of one embodiment of a wireless, short range, vehicular communication system 100 of the present invention. The system 100 is comprised of one or more vehicles 104 and the fixed roadway infrastructure 102, such as a DSRC road side unit (DSRC RSU).

The vehicles 104 are each capable of transmitting and receiving data messages 106, 108. The data messages 106, 108 may be comprised of vehicle velocity and vehicle location as well as other necessary information. As described subsequently, the data messages 106, 108 are sent in an encrypted or digitally signed format to prevent monitoring of the information and/or to assure the recipient of the messages that the sender is a legitimate terminal, that is, to protect the user/infrastructure from attacks from hackers.

The vehicles 104 are also in communication 108 with the roadway infrastructure 102. The infrastructure 102 is comprised of a large quantity of low power transmitters/receivers deployed to communicate wirelessly with the vehicles 104 as they travel along roads.

Figure 2:
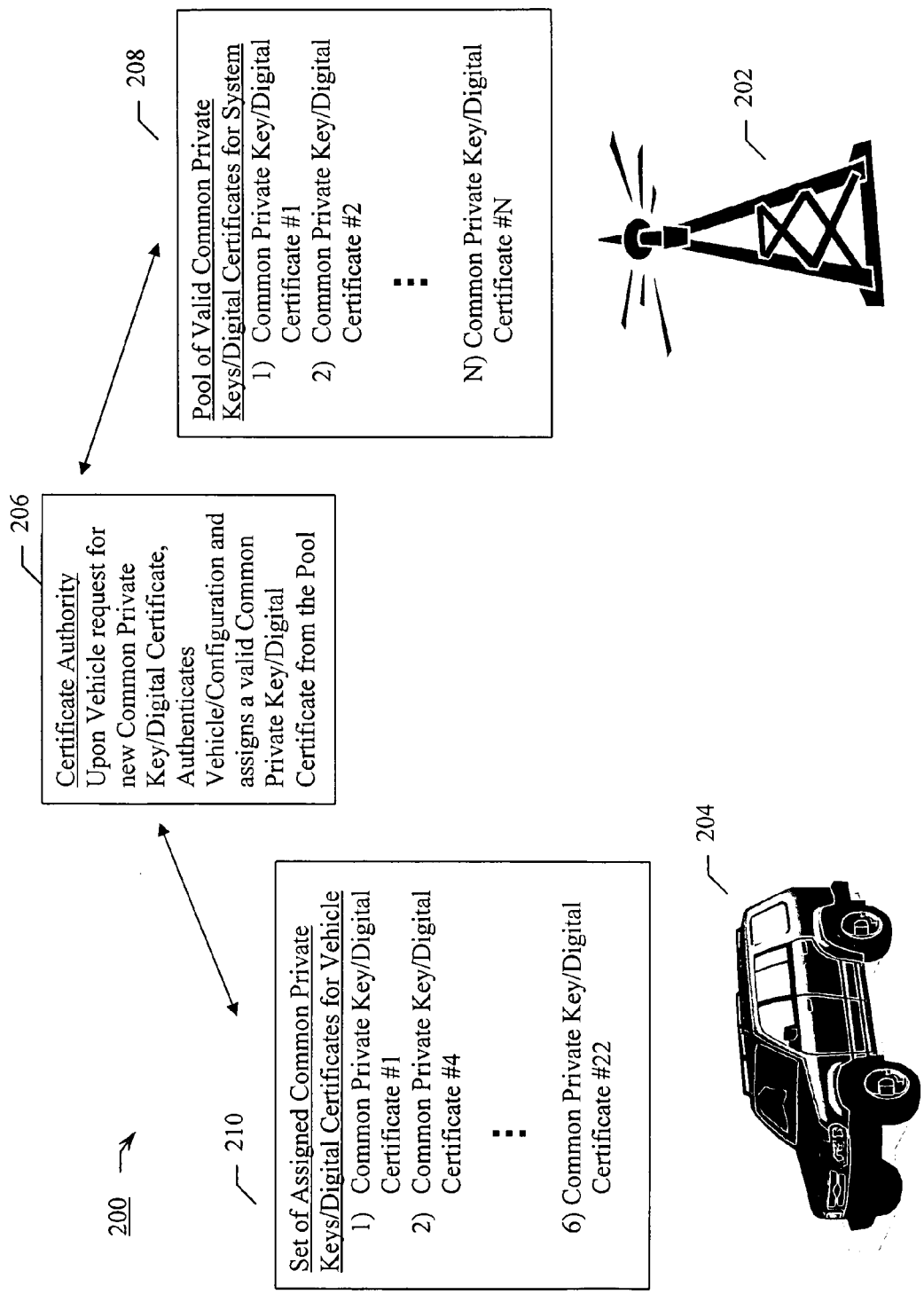
FIG. 2 shows a block diagram of one embodiment of the vehicular system in accordance with the embodiment of FIG. 1.

FIG. 2 illustrates a block diagram of one embodiment of a wireless communication system and vehicle 200 of the present invention. In FIG. 2, the wireless system/roadway infrastructure 202 has a pool 208 of currently valid common private key/digital certificate pairs that can be utilized to sign/encrypt. A vehicle 204 has an assigned set 210 (such as 6 or more) of these valid common private key/digital certificate pairs from which it randomly selects a common private key/digital certificate pair to sign/encrypt a message broadcast over the wireless system 202. When requesting a new common private key/digital certificate pair, the vehicle 204 encrypts its identity and authenticates itself using a unique or personal private key and certificate provided to it at manufacture by a certificate authority (CA/OEM) 206. The certificate authority verifies that the vehicle 204 is a valid user and/or configuration and assigns a new valid common private key/digital certificate pair from the pool 208. This new private key/digital certificate pair is encrypted using the user's unique personal public key, and the CA's private key, and it is transmitted to the user/vehicle. The wireless system 202 periodically revokes the validity of one or more common private key/digital certificate pairs by issuing a certificate revocation list (CRL) due to malicious activity, bad actors or other reasons, forcing all vehicles 204 having those common private key/digital certificate pair in their assigned sets 210 to re-authenticate themselves with the certificate authority 206.

A pool of 1000 common private key/digital certificate pairs with a random set of 5 common private key/digital certificate pairs for each vehicle results in 8.25 trillion unique revocation combinations (1000!/(995!*5!)). A pool of 1000 common private key/digital certificate pairs with a random set of 6 common private key/digital certificate pairs for each vehicle results in 1368 trillion unique revocation combinations (1000!/(994!*6!)). As such, in embodiments of the present invention, any malicious users or problem vehicles/users will quickly and uniquely be identified to the wireless system/CA as they have common private key/digital certificate pairs revoked and replaced in their assigned set. The act of replacing revoked common private key/digital certificate pairs in embodiments of the present invention also require that the vehicle/user temporarily identify itself. Given the extremely low probability of any two users having the same key set, any user that is required to replace keys regularly, or, worse, has all of its keys revoked in a short period of time becomes suspect as the cause of the revocation action. In this way the system allows for anonymity, but is able to identify erroneous or misbehaving users if they attempt to remain in the system (by replacing their keys). If the bad actors choose not to replace their revoked keys, then they are excluded from the system since all of their keys become invalid as they are revoked. With no usable keys, either a bad actor is required to expose itself, or it is excluded from the system.

Figure 3:
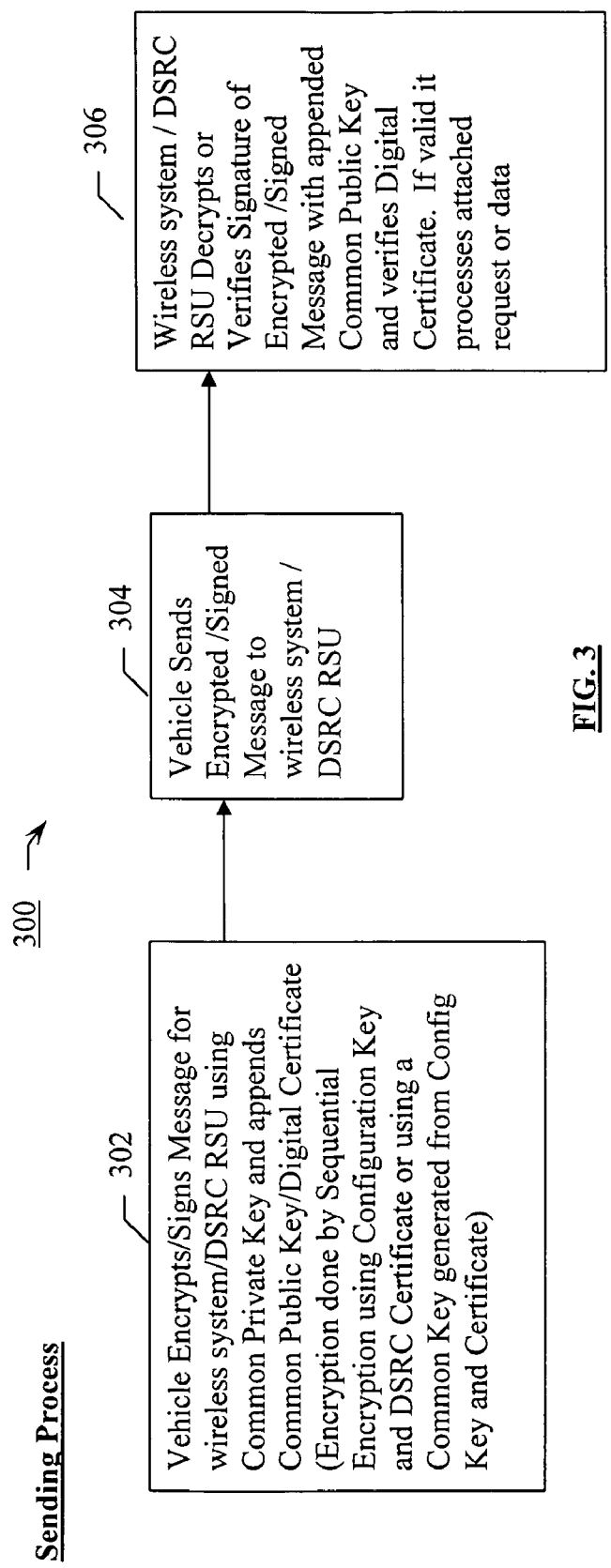
FIG. 3 shows a flowchart of a method for sending a data message from a vehicle to the wireless system in accordance with an embodiment of the present invention.

FIG. 3 illustrates a simplified flowchart of the data message sending process 300 from a vehicle to the wireless system in accordance with an embodiment of the present invention. In FIG. 3, the vehicle encrypts and/or signs the message 302 to be sent to the wireless system using a randomly selected common private key from its set of assigned common private key/digital certificate pairs and appends or identifies the related common public key (that corresponds to the common private key) and the paired digital certificate that is signed/created by the certificate authority. The vehicle then sends 304 the encrypted/signed message to the wireless system/DSRC RSU, which uses the attached or identified common public key and digital certificate to authenticate the message as coming from a valid user and decrypt/verify the message contents 406. If the message comes from an authenticated vehicle/user and the message contents decrypt/verify, the wireless system proceeds to process the message. If the vehicle/user is not authentic and/or the message contents do not decrypt/verify, the recipient ignores the message and/or alerts a system authority and provides the certificate used to secure the bad message.

Figure 4:
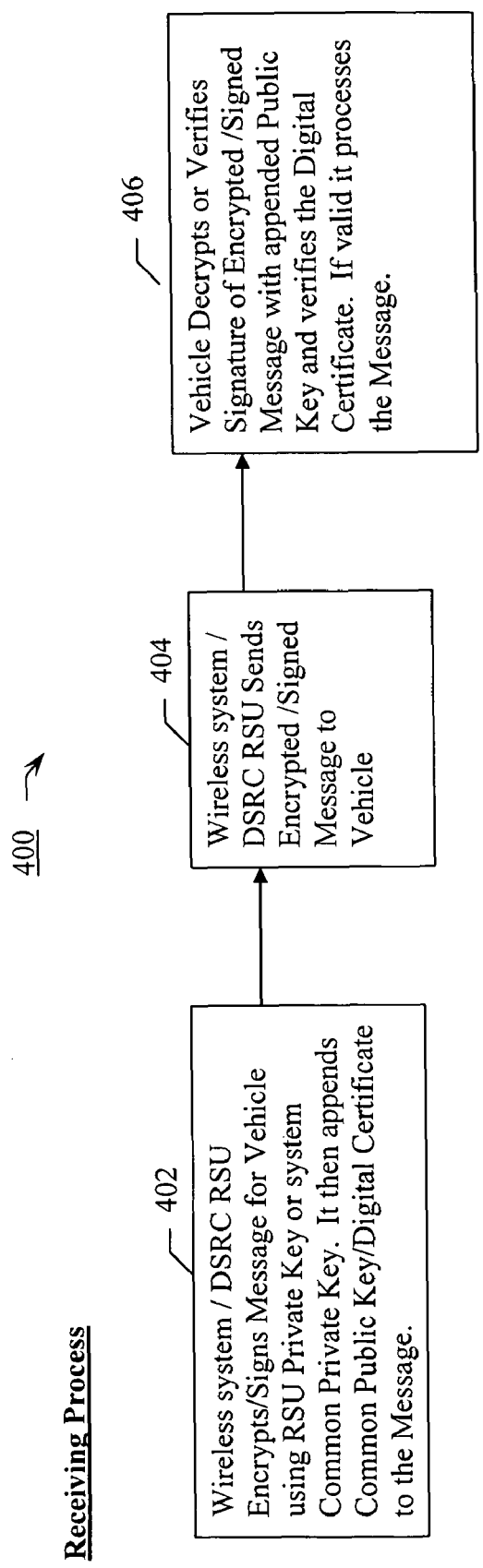
FIG. 4 shows a flowchart of a method for receiving a data message from the wireless system to a vehicle in accordance with an embodiment of the present invention.

FIG. 4 illustrates a simplified flowchart of the data message receiving process 400 from the wireless system to the vehicle in accordance with an embodiment of the present invention. In FIG. 4, the wireless system/DSRC RSU encrypts and/or signs the message 402 to be sent to the vehicle/user using a wireless system/DSRC RSU private key that may be common to the wireless system or specific to the RSU sending the message and appends or identifies the related wireless system/RSU public key (to the wireless system/RSU private key being utilized) and/or the paired digital certificate that is signed/created by the certificate authority. The wireless system/RSU then sends 404 the encrypted/signed message to the vehicle/user, which uses the attached or identified wireless system/RSU public key and digital certificate to authenticate the message as coming from the wireless system/RSU and decrypt/verify the message contents 406. If the message comes from an authentic wireless system/RSU and the message contents decrypt/verify, the vehicle proceeds to process the message. If the wireless system/RSU is not authentic and/or the message contents do not decrypt/verify, the vehicle/user ignores the message and/or alerts a system authority. It is also noted that, messages coming from the wireless system/RSU need not always be signed or encrypted.

Figure 5:
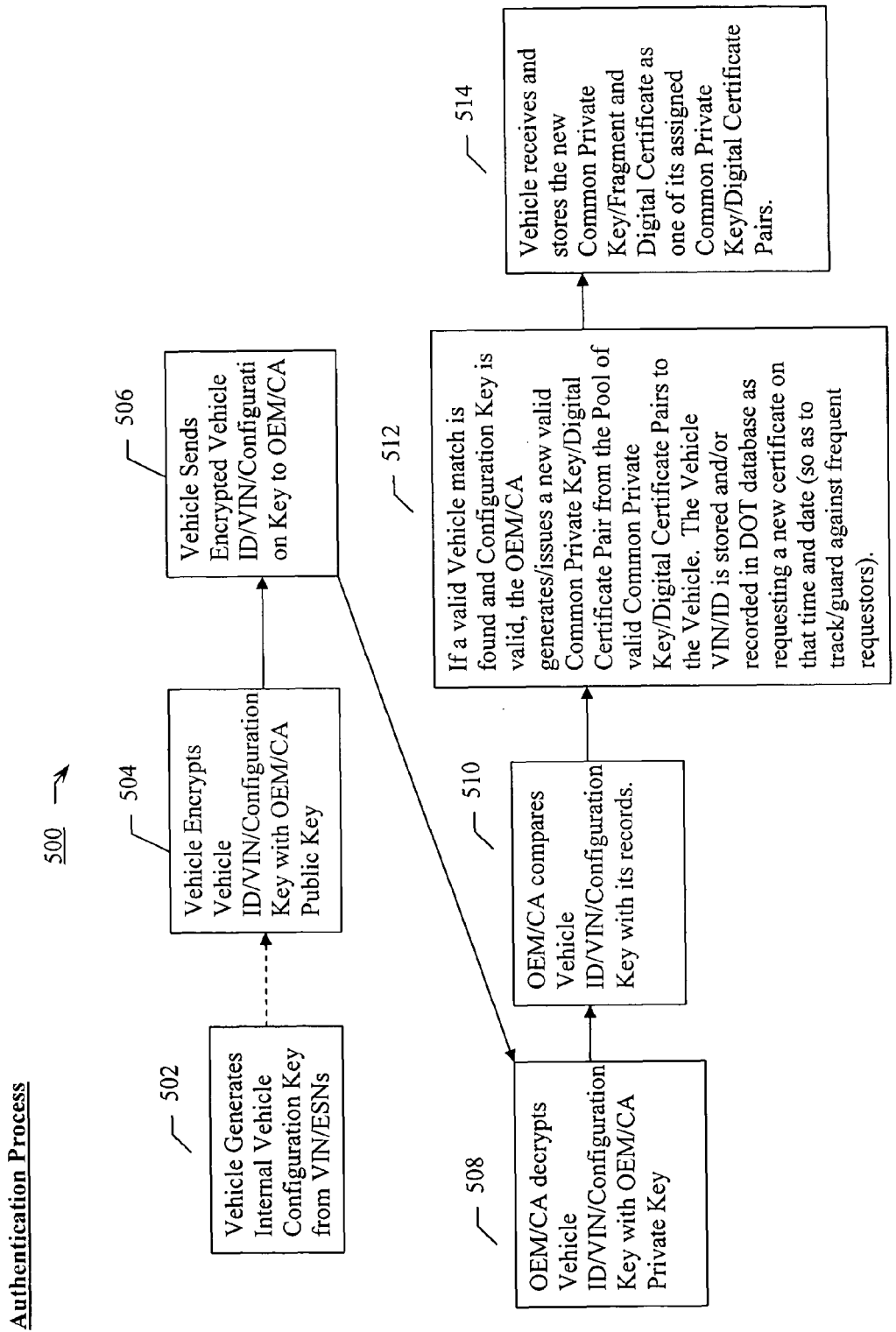
FIG. 5 shows a flowchart of a method for authenticating a vehicle to the wireless system in accordance with an embodiment of the present invention.

FIG. 5 illustrates a simplified flowchart of a common private key/digital certificate pair assigning process with vehicle/user authentication 500 in accordance with an embodiment of the present invention. In FIG. 5, the vehicle encrypts a unique vehicle ID, VIN or Configuration Key with a wireless system/OEM/CA Public Key. The vehicle can optionally generate 502 the configuration key from the vehicle VIN, the electronic serial numbers (ESNs) of the vehicle internal components and/or their software versions. This will allow the vehicle configuration to be verified as being proper, in addition to identifying it. The vehicle then sends 506 the encrypted vehicle ID/VIN/configuration key across the wireless system to the certificate authority and/or original equipment manufacturer (OEM/CA) for vehicle/user authentication. The OEM/CA then decrypts 508 the vehicle ID/VIN/configuration key with its copy of the wireless system/OEM/CA Private Key and compares 510 the contained vehicle ID/VIN/configuration key with its record of valid vehicles and/or configurations. If a valid match is found 512, the vehicle/user is authenticated and the OEM/CA issues a new valid common private key/digital certificate pair from the pool of valid common private key/digital certificate pairs and sends it to the requesting vehicle. The OEM/CA then stores the requesting vehicle VIN/ID and/or records it in an appropriate police or department of transportation (DOT) database as having requested a new certificate on that time and date (so as to track frequent requesters and guard against bad/problem actors). The vehicle receives and stores 514 the new common private key/digital certificate pair as one of its assigned common private key/digital certificate pairs.

In an alternative embodiment, only a common private certificate/digital certificate pair is sent back to the requesting vehicle and not a full common private key/digital certificate pair. The common private certificate is generated by the OEM/CA so as to allow the vehicle to generate the full common private key of the assigned common private key/digital certificate pair utilizing its internally generated configuration key. In this way no complete common private key/digital certificate pair is sent to the vehicle or unencrypted configuration key sent out from the vehicle, allowing for increased security and verification of vehicle identity/configuration. In one embodiment, the configuration key is not stored internally in the vehicle and must be generated each time at start up. One such configuration key system is detailed in U.S. patent application, which is commonly assigned.

The common private key can be internally generated in the vehicle from the common private certificate fragment via sequential encrypting/signing of the outgoing message first using the vehicle configuration key and then using the selected common private certificate or through pre-generating the common private key in the vehicle before sending data to the wireless system for each assigned common private certificate utilizing the configuration key.

FIG. 6 illustrates a simplified flowchart of a common private key/digital certificate pair revocation process 600 in accordance with an embodiment of the present invention. In FIG. 6, a vehicle/user in utilizing its set of valid common private key/digital certificate pairs receives 602 a certificate revocation list (CRL) from the wireless system. In one embodiment of the present invention, the CRL is broadcast as a housekeeping message and is received by all network participants. If one of the common private key/digital certificate pairs assigned to the vehicle/user is listed in CRL 604, it is discarded or "zeroed" by the vehicle. The vehicle then contacts the OEM/CA and begins the authentication process detailed in FIG. 5 to acquire a replacement valid common private key/digital certificate pair from the pool. When all the vehicle's common private key/digital certificate pairs are on the CRL list and the vehicle cannot acquire new common private key/digital certificate pairs from the OEM/CA 606, the wireless system and/or other vehicles will not accept or process its messages and the vehicle is frozen out of the wireless system. It is noted that, in one embodiment, a base level of messages and/or system privileges may be allowed a vehicle/user that has no valid common private key/digital certificate pairs assigned to it in order to maintain a base level of functionality and/or system safety.

In other embodiments, the wireless system and/or vehicle may also optionally take further action as specified by the system, such as alerting an authority, alerting an OEM/CA, entering "limp home" mode, or requiring authorization/service/re-activation to re-validate vehicle to the wireless system. A vehicle/user that has had all its common private key/digital certificate pairs revoked may also be assigned a special "black" private key/digital certificate pair that allows it to be identified and tracked in the system by authorities.

In one embodiment, the embodiments of the present invention are performed in a dedicated short range communications (DSRC) system. Such a system could involve automobiles as the vehicles/users, however, the present invention is not limited to transportation. Other systems requiring such anonymous security can also use the present invention. For example, between a wireless terminal and a base station.

CONCLUSION

A wireless vehicle and infrastructure system has been described that allows for utilization of a quasi-anonymous common private key/digital certificate pool, such that all vehicles are authenticated to the system, but no one vehicle/user can be readily identified during their use of the system because of use of a set of common private key/digital certificate pairs that are randomly assigned to each vehicle from the pool where common private key/digital certificate pairs in each vehicle's assigned set can be common across multiple vehicles. Vehicle/user anonymity is only temporarily removed during vehicle/user re-authentication and re-issuance of new common private key/digital certificate pairs to the vehicle/user from the pool in the wireless vehicle and infrastructure system. In one embodiment of the present invention, the vehicle-to-vehicle and vehicle-to-infrastructure wireless communication system utilized a limited pool of common private key/digital certificate pairs utilizes to digitally sign or encrypt messages from each vehicle and authenticate it to the system as an authorized and valid user/vehicle. The pool of common private key/digital certificate pairs is randomly assigned and shared amongst the users/vehicles utilizing the wireless communication system. Each user/vehicle is assigned multiple valid common private key/digital certificate pairs from the pool and randomly selects a certificate for use to sign or encrypt each message to the wireless communication network, such that any given common private key/digital certificate pair may be in use by multiple users/vehicles at a given moment, ensuring relative anonymity. A user or vehicle, however, must temporarily give up its anonymity to authenticate itself to the system in order for it to be assigned a new valid common private key/digital certificate pair from the currently active pool of common private keys/digital certificates. This is accomplished by sending a vehicle identifier, such as an ID, vehicle identification number (VIN) or a generated "configuration key", to a certificate authority (CA) and/or the original equipment manufacturer (OEM). The CA/OEM then authenticates the vehicle and/or onboard equipment as valid and assigns a new common private key/digital certificate pair from the currently valid pool. The configuration key can include such information as the vehicle VIN and/or the electronic serial numbers (ESNs) of vehicle systems, the onboard equipment (OBE) or the wireless onboard unit (OBU). Pairs of common private keys/digital certificates from the valid pool can be revoked by the wireless communication system, which periodically transmits a certificate revocation list (CRL). Users/vehicles that have one or more revoked certificates assigned must re-authenticate with the CA/OEM to be assigned a new valid certificate. This allows the wireless system to identify, track and/or revoke access rights to bad actors.

Although specific embodiments have been illustrated and described herein, it will be appreciated by those of ordinary skill in the art that any arrangement that is calculated to achieve the same purpose may be substituted for the specific embodiments shown. Many adaptations of the invention will be apparent to those of ordinary skill in the art. Accordingly, this application is intended to cover any adaptations or variations of the invention. It is manifestly intended that this invention be limited only by the following claims and equivalents thereof.

What is claimed is:

1. A method of assigning a plurality of private keys to a vehicle in a wireless system, the method comprising:
   generating a vehicle identifier that is indicative of the vehicle based on at least one of a hardware configuration and a software configuration of the vehicle such that the vehicle identifier changes when the at least one of the hardware configuration and the software configuration changes;
   encrypting the vehicle identifier at the vehicle;
   sending a request for the private keys with the encrypted vehicle identifier from the vehicle to a certificate authority;
   obtaining an authentication of the vehicle based on the encrypted vehicle identifier to assign the private keys to the vehicle;
   selecting the plurality of private keys from a pool of common private keys, at least one of the selected private keys being used for encrypting a message at the vehicle, and each of the private keys in the pool of common private keys being shared by a plurality of vehicles;
   sending the selected private keys to the vehicle; and
   storing the selected private keys in the vehicle.

2. The method of claim 1, wherein
the wireless system is a Dedicated Short Range Communications (DSRC) wireless system.

3. The method of claim 1, wherein
the vehicle identifier is one of a vehicle ID, a VIN, and a configuration key.

4. The method of claim 3, wherein
the configuration key is generated internally by the vehicle from one or more of a VIN, one or more electronic serial numbers (ESNs) of vehicle systems, an identifier of on board equipment, and one or more vehicle software version numbers.

5. The method of claim 1, wherein
the selecting of the private keys from the pool of the common private keys, the sending of the selected private keys to the vehicle, and the storing of the selected private keys in the vehicle further includes generating a private certificate from a vehicle configuration key such that the private certificate corresponds to one of the private keys from the pool of the common private keys, sending the selected private certificate to the vehicle, and storing the selected private certificate in the vehicle, the vehicle generating each of the selected private keys from the private certificate by utilizing the vehicle identifier.

6. The method of claim 1, wherein
the storing of the selected private keys in the vehicle further includes storing each of the selected private keys as a valid private key in a set of currently valid private keys.

7. The method of claim 1, wherein
the selecting of the private keys from the pool of the common private keys, the sending of the selected private keys to the vehicle, and the storing of the selected private keys in the vehicle further includes selecting a plurality of private key/digital certificate pairs from a pool of common private key/digital certificate pairs, sending the selected private key/digital certificate pairs to the vehicle, and storing the selected private key/digital certificate pairs in the vehicle.

8. The method of claim 1, wherein
the sending of the selected private keys to the vehicle and the storing of the selected private keys in the vehicle further includes encrypting the selected private keys with a certificate authority private key, sending the selected private keys to the vehicle, decrypting the selected private keys at the vehicle with the certificate authority public key, and storing the selected private keys in the vehicle.

9. The method of claim 1, wherein
the encrypting of the vehicle identifier at the vehicle further includes encrypting the vehicle identifier at the vehicle with a system public key, the system public key including a configuration authority public key or an original equipment manufacturer public key, and
the obtaining of the authentication of the vehicle further includes decrypting the encrypted vehicle identifier at the certificate authority with a system private key and authenticating the vehicle against a list of valid vehicle identifiers.

10. A method of operating a wireless system, the method comprising:
   sending a message to the wireless system from a vehicle by randomly using a different private key/digital certificate pair from a set of valid private key/digital certificate pairs stored on the vehicle to sign the message being sent to the wireless system, the wireless system maintaining a pool of current valid common private key/digital certificate pairs that includes the set of the valid private key/digital certificate pairs, each of the private key/digital certificate pairs in the pool of currently valid common private key/digital certificate pairs being shared by and stored in a plurality of vehicles;

preparing a certificate revocation list message including a list of revoked private key/digital certificate pairs to be revoked;

revoking a valid private key/digital certificate pair by sending the certificate revocation list message from the wireless system to the vehicle, and the vehicle removing the revoked private key/digital certificate pairs on the certificate revocation list message from the vehicle;

sending a request for a new currently valid private key/digital certificate pair with an encrypted vehicle identifier from the vehicle to a certificate authority with the vehicle identifier being indicative of the vehicle and based on at least one of a hardware configuration and a software configuration of the vehicle such that the encrypted vehicle identifier changes when the at least one of the hardware configuration and the software configuration changes;

obtaining an authentication of the vehicle based on the encrypted vehicle identifier to assign the new currently valid private key/digital certificate pair; and receiving and storing on the vehicle the new currently valid private key/digital certificate pair from the pool of currently valid common private key/digital certificate pairs that is selected and assigned by the certificate authority.

11. The method of claim 10, wherein
the wireless system is a Dedicated Short Range Communications (DSRC) wireless system.

12. The method of claim 10, further comprising
revoking an access right of the vehicle to the wireless system when the vehicle has replaced the revoked private key/digital certificate pair more than a predetermined threshold, the sending of the request for the new currently valid private key/digital certificate pair with the vehicle identifier, the obtaining of the authentication of the vehicle, and the receiving and storing of the new private key/digital certificate pair further including:

encrypting the vehicle identifier of the vehicle;
sending the encrypted vehicle identifier from the vehicle to the certificate authority;
decrypting the encrypted vehicle identifier at the certificate authority;
authenticating the vehicle against a list of valid vehicle identifiers;
selecting a private key/digital certificate pair from the pool of valid common private key/digital certificate pairs;
encrypting and sending the selected private key/digital certificate pair to the vehicle; and
decrypting and storing the selected private key/digital certificate pair in the vehicle.

13. The method of claim 10, wherein
the sending of the message to the wireless system from the vehicle and the sending of the certificate revocation list message from the wireless system to the vehicle further includes sending the message to a second vehicle from the vehicle and sending the certificate revocation list message from the second vehicle to the vehicle.

14. The method of claim 10, wherein
the vehicle identifier is one of a vehicle ID, a VIN, and a configuration key.

15. The method of claim 14, wherein
the configuration key is generated internally by the vehicle from one or more of a VIN, one or more electronic serial numbers (ESNs) of vehicle systems, an identifier of on board equipment, and one or more vehicle software version numbers.

16. The method of claim 10, wherein
each private key/digital certificate pair is a private certificate/digital certificate pair, and
the vehicle generates each private key from a private certificate by utilizing the vehicle identifier.

17. The method of claim 16, wherein
each private key is generated from a stored private certificate utilizing the vehicle identifier by sequentially encrypting or signing an outgoing message with the vehicle identifier and the stored private certificate.

18. The method of claim 16, wherein
each private key is pre-generated for use in encrypting or signing outgoing messages upon vehicle start-up from each private certificate stored in the vehicle utilizing the vehicle identifier.

19. A method of operating a vehicle to communicate based on a public-key cryptography using a private key for encrypting a message and a public key for decrypting the message, the method comprising:

randomly using a different private key/digital certificate pair from a set of valid private key/digital certificate pairs stored on a vehicle to sign or encrypt the message being sent to a wireless system, the wireless system maintaining a pool of currently valid common private key/digital certificate pairs that includes the set of the valid private key/digital certificate pairs;

receiving a certificate revocation list message sent out by the wireless system that contains a list of revoked private key/digital certificate pairs to be revoked; and replacing a private key/digital certificate pair of the set of stored private key/digital certificate pairs on the vehicle if it is on the certificate revocation list by
contacting a certificate authority and authenticating the vehicle by sending an encrypted vehicle identifier, which is indicative of the vehicle based on at least one of a hardware configuration and a software configuration of the vehicle such that the vehicle identifier changes when the at least one of the hardware configuration and the software configuration changes,
selecting a private key/digital certificate pair from the pool of valid common private key/digital certificate pairs, with each of the private keys in the pool of common private keys being shared by another vehicle, and
receiving and storing on the vehicle a new assigned valid private key/digital certificate pair from the pool of currently valid common private key/digital certificate pairs from the certificate authority.

20. The method of claim 19, wherein
the wireless system is a Dedicated Short Range Communications (DSRC) wireless system.

21. The method of claim 19, wherein
the replacing of the private key/digital certificate pair of the set of stored private key/digital certificate pairs on the vehicle if it is on the certificate revocation list further includes:
sending the encrypted vehicle identifier from the vehicle to the certificate authority;
decrypting the encrypted vehicle identifier at the certificate authority;
authenticating the vehicle against a list of valid vehicle identifiers;
encrypting and sending the selected private key/digital certificate pair to the vehicle; and decrypting and storing the selected private key/digital certificate pair in the vehicle.

22. The method of claim 19, wherein
the randomly using of the different private key/digital certificate pair from the set of valid private key/digital certificate pairs stored on the vehicle to sign or encrypt the message being sent to the wireless system further includes randomly using the different private key/digital certificate pair from the set of valid private key/digital certificate pairs stored on the vehicle to sign or encrypt the message being sent to a second vehicle.

23. The method of claim 19, wherein
the vehicle identifier is one of a vehicle ID, a VIN, and a configuration key.

24. The method of claim 23, wherein
the configuration key is generated internally by the vehicle from one or more of a VIN, one or more electronic serial numbers (ESNs) of vehicle systems, an identifier of on board equipment, and one or more vehicle software version numbers.

25. The method of claim 19, wherein
each private key/digital certificate pair is a private certificate/digital certificate pair, and
the vehicle generates each private key from the private certificate by utilizing the vehicle identifier.

26. The method of claim 25, wherein
each private key is generated from a stored private certificate utilizing the vehicle identifier by sequentially encrypting or signing an outgoing message with the vehicle identifier and the stored private certificate.

27. The method of claim 25, wherein
each private key is pre-generated for use in encrypting or signing outgoing messages upon vehicle start-up from each private certificate stored in the vehicle utilizing the vehicle identifier.

28. A wireless communication system based on a public-key cryptograph using a private key for encrypting a message and a public key for decrypting the message, the wireless communication system comprising:
a wireless system maintaining a pool of currently valid common private key/digital certificate pairs including a selected set of the valid private key/digital certificate pairs; and
a vehicle adapted to send the message by randomly using a different private key/digital certificate pair from the selected set of valid private key/digital certificate pairs stored on the vehicle to sign the message being sent by the vehicle,
each of the private key/digital certificate pairs in the pool of currently valid common private key/digital certificate pairs being shared by a plurality of vehicles,
the vehicle being further adapted to generate an encrypted vehicle identifier that is indicative of the vehicle based on at least one of a hardware configuration and a software configuration of the vehicle such that the vehicle identifier changes when the at least one of the hardware configuration and the software configuration changes, send a request for the private key/digital certificate pairs including the encrypted vehicle identifier, and receive and store the selected set of private key/digital certificate pairs.

29. The wireless communication system of claim 28, wherein
the wireless system is adapted to revoke a valid private key/digital certificate pair by placing a selected private key/digital certificate pair on a certificate revocation list message sent out by the wireless system.

30. The wireless communication system of claim 29, wherein
the wireless system is adapted to replace a revoked private key/digital certificate pair by authenticating the vehicle to the wireless system by sending a vehicle identifier to a certificate authority to validate the vehicle identity and receiving and storing on the vehicle a new currently valid private key/digital certificate pair from the pool of currently valid common private key/digital certificate pairs.

31. The wireless communication system of claim 28, wherein
the wireless system is a Dedicated Short Range Communications (DSRC) wireless system.

32. A vehicle comprising:
a vehicle component adapted to send a message by randomly using a different private key/digital certificate pair from a set of valid private key/digital certificate pairs stored on the vehicle to sign the message being sent by the vehicle to a wireless system, the wireless system maintaining a pool of currently valid common private key/digital certificate pairs that includes the set of the valid private key/digital certificate pairs, each of the private key/digital certificate pairs in the pool of currently valid common private key/digital certificate pairs being shared by a plurality of vehicles,
the vehicle component being further adapted to generate an encrypted vehicle identifier that is indicative of the vehicle based on at least one of a hardware configuration and a software configuration of the vehicle such that the encrypted vehicle identifier changes when the at least one of the hardware configuration and the software configuration changes, send a request for the private key/digital certificate pairs including the encrypted vehicle identifier, and receive and store the private key/digital certificate pairs selected from the pool of currently valid common private key/digital certificate pairs.

33. The vehicle of claim 32, wherein
the vehicle component is adapted to revoke a valid private key/digital certificate pair by receiving one or more revoked private key/digital certificate pair on a certificate revocation list message sent out by the wireless system.

34. The vehicle of claim 33, wherein
the vehicle component is adapted to replace the revoked private key/digital certificate pair of the set of valid private key/digital certificate pairs by sending the vehicle identifier to a certificate authority to validate the vehicle identity and receiving and storing on the vehicle a new currently valid private key/digital certificate pair from the pool of currently valid common private key/digital certificate pairs.

35. The vehicle of claim 32, wherein
the wireless system is a Dedicated Short Range Communications (DSRC) wireless system.

* * * * *